United States Patent [19]
Wong

[11] Patent Number: 6,006,070
[45] Date of Patent: Dec. 21, 1999

[54] MULTI-FUNCTION INTERACTIVE COMMUNICATIONS SYSTEM WITH CIRCULARLY/ELLIPTICALLY POLARIZED SIGNAL TRANSMISSION AND RECEPTION

[75] Inventor: Thomas T. Y. Wong, Skokie, Ill.

[73] Assignee: Telecommunications Equipment Corporation, Palatine, Ill.

[21] Appl. No.: 08/949,478

[22] Filed: Oct. 14, 1997

Related U.S. Application Data

[63] Continuation of application No. 08/420,372, Apr. 7, 1995, Pat. No. 5,701,591.

[51] Int. Cl.$^6$ .................................................. H04B 17/02
[52] U.S. Cl. .............................................. 455/63; 342/366
[58] Field of Search ...................... 455/209, 314, 455/303, 304, 63, 65, 273, 101, 137, 60, 69, 139, 138, 67.1, 67.3, 67.5, 305, 275, 276.1; 342/361, 362, 363, 364, 365, 366, 380, 383, 381, 384; 364/514 R

[56] References Cited

U.S. PATENT DOCUMENTS

| | | |
|---|---|---|
| 3,656,165 | 4/1972 | Walter et al. . |
| 3,665,480 | 5/1972 | Fassett . |
| 3,827,051 | 7/1974 | Foldes . |
| 3,883,872 | 5/1975 | Fletcher et al. . |
| 3,956,699 | 5/1976 | Leahy . |
| 4,087,818 | 5/1978 | Kreurel, Jr. . |
| 4,106,015 | 8/1978 | Beguin et al. . |
| 4,146,893 | 3/1979 | Inagaki et al. . |
| 4,228,410 | 10/1980 | Goudey et al. . |
| 4,264,908 | 4/1981 | Pelchat et al. . |
| 4,310,813 | 1/1982 | Yuuki et al. . |
| 4,329,687 | 5/1982 | Kloevekorn et al. . |
| 4,494,117 | 1/1985 | Coleman . |
| 4,716,415 | 12/1987 | Kelly . |
| 4,723,321 | 2/1988 | Saleh . |
| 4,736,392 | 4/1988 | Kammeyer et al. ..................... 364/724 |
| 4,737,793 | 4/1988 | Munson et al. . |
| 4,747,160 | 5/1988 | Bossard . |
| 4,757,319 | 7/1988 | Lankl ..................................... 342/378 |
| 4,811,021 | 3/1989 | Yoshimoto et al. . |
| 4,881,077 | 11/1989 | Jehle et al. . |
| 4,965,868 | 10/1990 | Wong et al. . |
| 4,968,957 | 11/1990 | Hudspeth et al. . |
| 5,014,352 | 5/1991 | Chung .................................... 455/314 |
| 5,075,697 | 12/1991 | Koizumi et al. . |
| 5,086,301 | 2/1992 | English et al. . |
| 5,103,238 | 4/1992 | Mahnad . |
| 5,185,753 | 2/1993 | Benda et al. . |
| 5,223,848 | 6/1993 | Rammos et al. . |
| 5,298,908 | 3/1994 | Piele . |
| 5,337,058 | 8/1994 | Cross . |
| 5,343,495 | 8/1994 | Lovell et al. ............................ 455/10 |
| 5,507,020 | 4/1996 | Lee . |

FOREIGN PATENT DOCUMENTS

| | | |
|---|---|---|
| 0228947 | 7/1987 | European Pat. Off. . |
| 9406227 | 3/1994 | WIPO . |

*Primary Examiner*—Ajit Patel
*Attorney, Agent, or Firm*—Pauley Petersen Kinne & Fejer

[57] ABSTRACT

A communications system that uses electromagnetic waves. The communications system preferably operates in the millimeter-wave frequencies, and provides relatively high signal restoration and isolation. The communications system can use polarization diversity to increase the capacity of a channel. Isolation and restoration features in the transceivers eliminate or reduce the effects of precipitation and/or reflection and diffraction from objects, and thus is well-suited for an urban environment.

13 Claims, 4 Drawing Sheets

MULTI-FUNCTION INTERACTIVE COMMUNICATIONS SYSTEM WITH CIRCULARLY/ELLIPTICALLY POLARIZED SIGNAL TRANSMISSION AND RECEPTION

This is a continuation of application 08/420,372 filed on Apr. 7, 1995 now U.S. Pat. No. 5,701,591.

BACKGROUND OF THE INVENTION

1. Field of the Invention

This invention relates to a method and apparatus for communications with electromagnetic waves. The system preferably operates at millimeter-wave frequencies and uses polarization diversity.

2. Description of Prior Art

The information transmission capacity of a communications system can be substantially increased with the use of polarization diversity. This is true for both one-way and two-way communications systems. Vertical and horizontal polarizations are often used in satellite communications and other point-to-point microwave links to isolate both transmit and receive signals, or to increase information capacity.

For local communications systems using a millimeter-wave carrier, polarization cross-talk caused by precipitation is a commonly encountered problem for systems using dual linearly polarized signal transmission. Further, where a transmission link involves successive reflections by buildings and other objects, as in an urban environment, considerable variations in the polarization state of the signals occur, making signal isolation by orthogonal polarization less effective.

For a given frequency, a circularly polarized plane or quasi-plane electromagnetic wave propagating in open space may have its field vectors revolving clockwise (CP), or counterclockwise (CCP). Two such waves, rotating oppositely with respect to each other, are orthogonal to each other and may be isolated with proper antenna feeds and electronic circuitry. However, precipitation and/or reflection/diffraction from buildings and other obstacles can distort the waves and cause elliptical polarization. If the waves become excessively elliptically polarized, the information carried by the waves cannot be retrieved.

U.S. Pat. No. 4,747,160 teaches a low power multi-function cellular television system capable of two-way communication services. An omnidirectional transmitter transmits vertical and horizontal linear polarized waves. The system taught by the '160 patent preferably operates in the 27.5 GHz to 29.5 GHz millimeter wave band.

U.S. Pat. No. 4,264,908 teaches a polarization correction network that automatically compensates for cross polarization caused by, for example, precipitation. The network transmits vertical and horizontal linearly polarized waves.

U.S. Pat. No. 4,106,015 discloses a radar system that eliminates rain echo signals. Pulsed, polarized waves are transmitted, and two separate receiving channels receive orthogonal components of a rain echo signal. The rain echo signal is eliminated by adjusting an amplitude of the orthogonal components of the rain echo signal, and then adjusting the phase of the signals to be opposite with respect to each other.

U.S. Pat. No. 4,737,793 discloses a dual-polarized microstrip antenna capable of simultaneously transmitting mutually orthogonal polarizations, including clockwise and counterclockwise circularly polarized waves, to double the capacity of a given frequency band.

U.S. Pat. No. 4,146,893 teaches a satellite communications system which compensates for polarization distortion caused by precipitation and incomplete polarization characteristics of antennas by predistorting a circularly polarized wave to an elliptically polarized wave. As the elliptically polarized wave encounters the depolarizing medium, a circular wave forms and is received by the satellite.

U.S. Pat. No. 3,956,699 discloses an electromagnetic wave communications system which transmits and receives waves having mutually orthogonal polarizations. The system provides polarization control prior to power amplification when transmitting, and subsequent to amplification when receiving.

U.S. Pat. No. 5,337,058 teaches a fast switching lens which is positioned in front of a radar antenna to manipulate the polarization of a transmitted wave to various polarizations. The lens can also receive waves of various polarizations.

U.S. Pat. No. 4,329,687 discloses a radar system which alternately radiates clockwise and counterclockwise circularly or elliptically polarized waves. A relatively high signal-to-clutter ratio is achieved by analyzing the phase differences between the two orthogonal components of the transmitted wave and the phase differences of the two orthogonal components of the received wave.

The prior art references discussed above fail to disclose a method or apparatus for a communications system that can restore circular polarization to a distorted wave, and can operate in an urban environment at the millimeter-wave frequencies. Thus, it is apparent that a communications system that operates in the millimeter-wave frequencies, provides dual polarization, and achieves relatively high signal restoration and isolation is needed.

SUMMARY OF THE INVENTION

It is one object of this invention to provide a method and apparatus for communications with electromagnetic waves that eliminates or greatly reduces the fading effects caused by precipitation.

It is another object of this invention to provide a method and apparatus that uses dual polarization to increase channel capacity and in which the effects of cross-polarization are negligible.

It is yet another object of this invention to provide a method and apparatus for a dual-polarization two-way communications system that can provide communications in millimeter-wave frequencies in urban environments despite negative effects of reflection and/or diffraction of waves due to obstacles.

These and other objects are achieved with a communications system in which dual polarization is utilized to effectively double the capacity of a given frequency band. According to one preferred embodiment of this invention, elliptically and/or circularly polarized waves are simultaneously broadcasted from a transmitting antenna. A first wave rotates in a direction opposite with respect to a second rotating wave. At millimeter-wavelength frequencies, such as those generally over 18 GHz, precipitation such as rain, snow, or fog, and diffraction/reflection due to urban obstacles, such as buildings, can attenuate and depolarize such waves. Consequently, circularly polarized waves can become elliptical, and the axes of the elliptical waves can rotate. Without proper signal isolation features, the information carried by such distorted waves can be irretrievable.

The communications system according to this invention includes an adaptive receiver capable of restoring circular polarization to such elliptically polarized waves. According to one preferred embodiment of this invention, the adaptive receiver includes an electromechanically driven antenna with an orthogonal-mode feed that receives the dual rotating waves. Components of each of the waves enter each of two channels. The frequency of the signals in the channels can be down-converted to an intermediate frequency (IF). If the received waves are elliptical, at any given time, the signals in the channel corresponding to the feed aligned with the major axis of the counter-rotating waves will have a greater magnitude than the signals in the channel corresponding to the feed aligned with the minor axis of the waves. Each channel preferably has automatic gain control circuitry to equalize the magnitude of the signals in the channels. Portions of the signals in each channel undergo a phase shift of ±90° and are combined with the signals of the other channel to isolate one rotating signal from the other rotating signal. A phase detector can detect the loss of quadrature between the two channels and emit a signal to a servomotor that rotates the orthogonal-mode feed of the antenna to align the feed with the major and minor axes of the signals.

According to one preferred embodiment of this invention, an antenna diversity control switch controls a plurality of antennas to track the incident signal. The diversity control switch samples the signal strength in each channel during the IF stage, and selects an antenna with sufficient signal intensity. Because the feeds of the selected antenna may not be precisely aligned with the major and minor axes of the rotating signals, an electronic phase shifter can provide quadrature control between the signals in the two channels.

Automatic gain control amplifiers can restore the signals in the channels to circular polarization, if necessary. The first rotating signal can be isolated from the second rotating signal by phase shifting a portion of each signal and recombining the phase-shifted portion with the other signal. The two isolated signals can be demodulated according to the modulation method used by the transmitter. Local oscillator tracking can be incorporated at the IF stage with the use of proper filtering and phase-lock loop circuitry. The use of a plurality of antennas and a diversity switch eliminates moving components, and is particularly suitable for implementation with monolithic integrated circuits. Such preferred embodiment is especially suited where compactness and/or low power consumption are desired.

According to another preferred embodiment of this invention, a control center of a communications system transmits two circularly or elliptically polarized waves over a substantial azimuthal area to a number of subscribers, each having a transceiver to receive the signals. The transceiver antenna is relatively highly directional, and thus can be relatively small. The subscriber can transmit a return signal back to the control center. Because the antenna is relatively highly directional, substantial directive gain can be achieved so that relatively minimal power is required to transmit the signal to the control center. The return signal can be used by the control center to select certain programming, or to adjust the power level of the transmission of the control center to compensate for fading caused by precipitation and/or obstacles.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

As used throughout the specification and claims, the phrases millimeter waves and millimeter-wave frequencies refer to relatively high frequency electromagnetic radiation, particularly frequencies over about 18 GHz.

An electromagnetic communications system that uses dual polarization for signal transmission can effectively double the capacity of a channel. However, at millimeter-wave frequencies, cross-polarization and fading effects due to precipitation constrain two-way communications that use such polarization diversity. For example, rain, snow, or fog can attenuate and/or depolarize such waves. Further, in an urban environment, buildings, trees, and other obstacles can also attenuate and/or depolarize such millimeter waves. These effects are particularly noticeable when a line-of-sight link is unavailable.

The method and apparatus for communications with electromagnetic waves according to this invention include signal restoration and isolation circuitry that achieve a communications system that can effectively operate in the millimeter-wave frequencies with polarization diversity in an urban environment. The method and apparatus according to this invention achieve such a communications system in the millimeter-waveband with considerable cost effectiveness.

Figure 1:
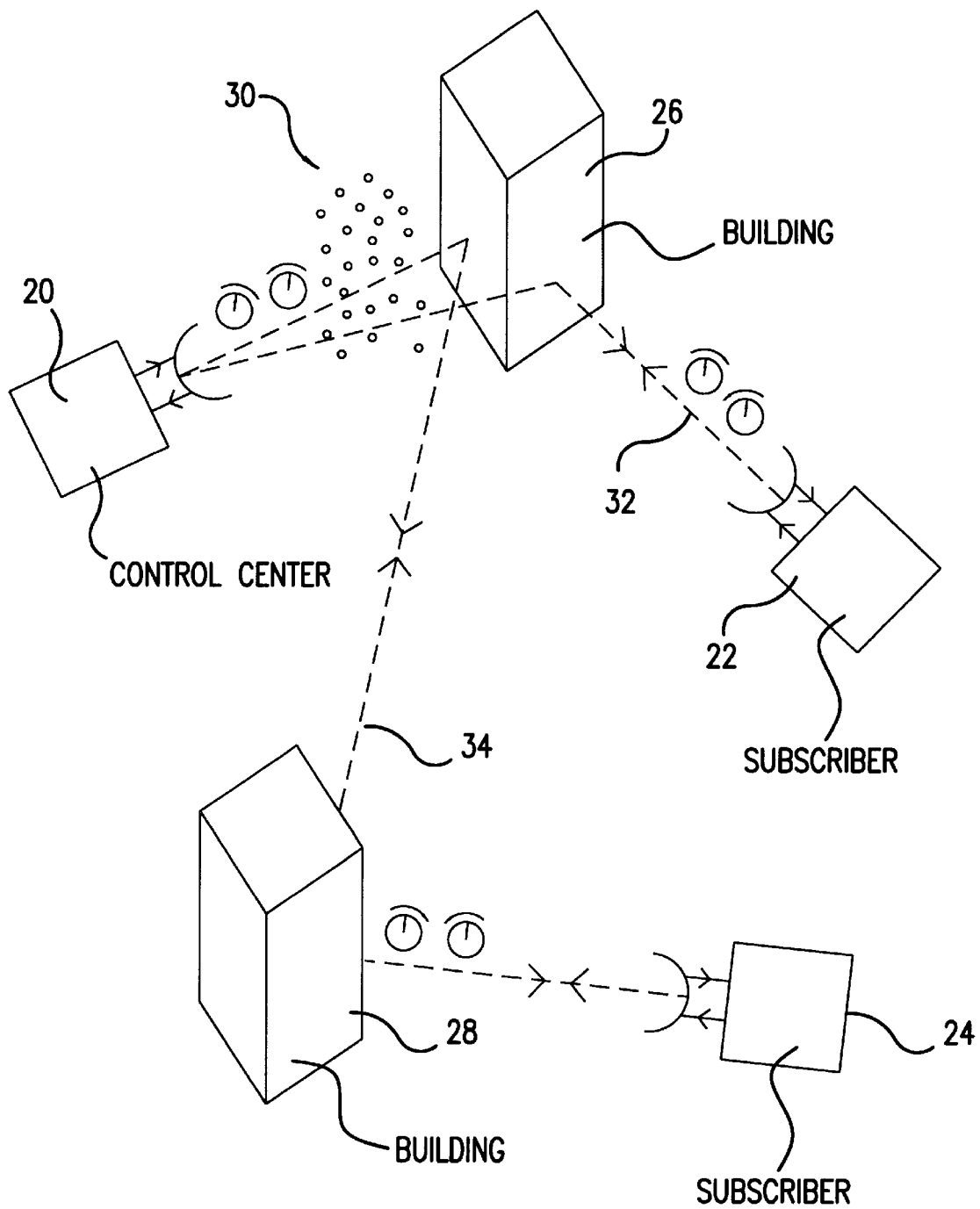
FIG. 1 is a diagrammatic view of a point-to-multi-point broadcast system according to one preferred embodiment of this invention.

FIG. 1 shows a diagrammatic view of a point-to-multi-point two-way broadcasting system according to one preferred embodiment of this invention. Control center 20 preferably simultaneously broadcasts two circularly or elliptically polarized waves rotating oppositely with respect to one another. If the depolarization effect of the medium is not severe, a combination of linear and circular/elliptical polarization can be used. According to another preferred embodiment of this invention, a single rotating circularly polarized wave provides sufficient channel capacity, and control center 20 transmits only one circular/elliptical polarized wave.

When two circularly polarized waves rotating oppositely with respect to each other are reflected or diffracted by most objects in an outdoor environment, such as building 26, or building 28, or when such waves encounter precipitation such as precipitation zone 30, the relative sense of rotation of the waves is preserved, however, the waves can become elliptically polarized. Because the same depolarizing medium is acting on each wave, the axes of the ellipse of the first rotating wave will remain closely aligned to the corresponding axes of the ellipse of the second rotating wave. With the receiver according to one preferred embodiment of this invention, as described in more detail below, such elliptical waves can be restored to circularly polarized waves and isolated, thus eliminating the potentially disastrous effects upon the waves from precipitation and reflection/diffraction from obstacles.

Control center 20 can transmit multi-channel programs having a variety of contents and signal formats to subscriber 22 and/or subscriber 24. Control center 20 can also receive return signals from subscriber 22 and/or subscriber 24 and perform switching and allocation of available channels according to the needs of subscriber 22 and/or subscriber 24.

Control center 20 preferably comprises an antenna that has substantial diversity in its radiation pattern, particularly with respect to azimuthal coverage. Although complete circular polarization in all directions may not be possible, elliptical polarization with relatively moderate eccentricity over a substantial area of distribution is feasible.

Precipitation zone 30, building 26 and building 28 may modify the polarization of the signals in two-way path 32 and/or two-way path 34. If the eccentricity in the ellipse prescribed by the field vector is not substantial, for example less than about 0.97, the two rotating signals in each of two-way path 32 and two-way path 34 can be discriminated with the receiver according to this invention. In relatively extreme circumstances, each rotating signal can approach linear polarization along the same direction as a result of reflection at an angle of incidence close to the Brewster angle. In such circumstances, an alternative signal path can be chosen, or, if no alternative signal path is available, an additional control center 20 or a relay station can be installed. Because the placement of the additional control center 20 or relay station is determined by signal strength and/or polarization degradation specific to a given environment, the method and apparatus for electromagnetic communications according to this invention differs from conventional cellular distribution systems. Such conventional systems use a regular cell pattern with a fixed cell area to cover a subscription area.

Depending on the radiation pattern required, control center 20 may have more than one antenna. According to another preferred embodiment of this invention, separate antennas that are aligned for optimal overlap in coverage are used to transmit and receive, respectively.

Figure 2:
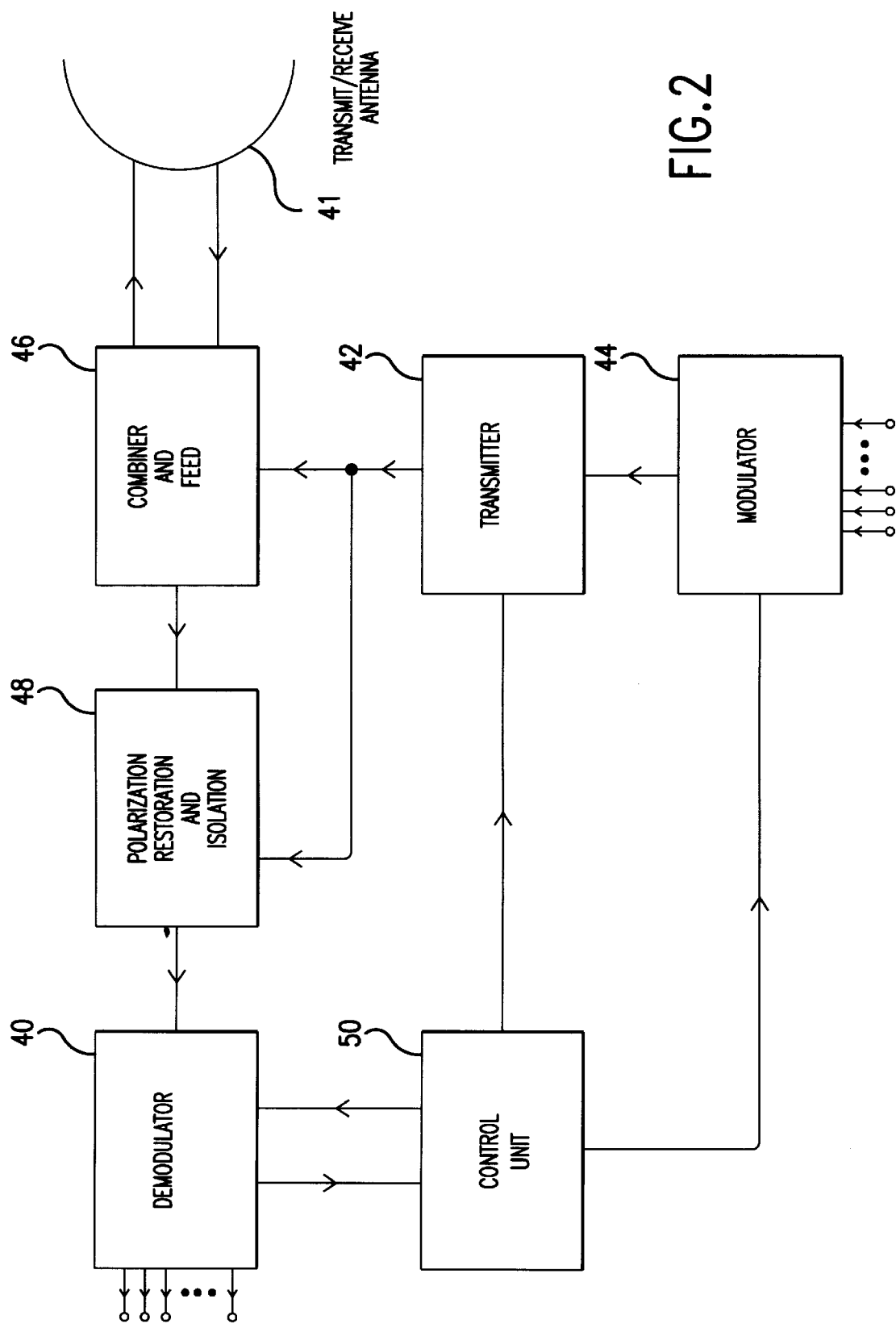
FIG. 2 is a block diagram of a transceiver according to one preferred embodiment of this invention.

As shown in FIG. 2, combiner 46 can accept signals from antenna 41 and transmitter 42 simultaneously. Controller 50 preferably coordinates the functions of the receiver or transceiver, and can provide allocation of channels or other services. Because all feed elements have finite signal isolation, a portion of the signal from transmitter 42 is preferably injected into signal isolator 48 for proper signal cancellation so that the receiver sensitivity can be maintained close to its intrinsic value. Additional signal isolation can be achieved by dedicating specific channels for receive only, and through the use of filter networks and synchronous detection. Demodulator 40 and modulator 44 can use spread spectrum modulation techniques, or any other modulation techniques known to those skilled in the art, to further increase channel capacity and signal isolation.

According to one preferred embodiment of this invention, subscriber 22 and/or subscriber 24 use a highly directional antenna. By using a reflector and proper feeds, or microstrip arrays, beam widths, such as −3 dB, smaller than about 5° can be achieved with an antenna that has a diameter less than about 12 inches, at about 28 GHz frequencies. Such an antenna generally eliminates fading due to multi-path propagation. Further, a return signal from subscriber 22 to control center 20 can be transmitted by retracing the signal transmitted from control center 20 to subscriber 22. The reciprocal nature of the forward-backward wave propagation process ensures the preservation of the sense of polarization between the signals, and guarantees a return path to control center 20 if subscriber 22 has sufficient power. Because the antenna of subscriber 22 is highly directive, substantial directive gain can be achieved so that the power required for the signal from subscriber 22 to control center 20 can be less than 100 milliwatts, and thus within the range of solid-state amplifiers.

In addition to providing communications to control center 20, control center 20 can use the return signal from subscriber 22 to adjust the power level of the transmitter to compensate for fading, if necessary. Modulation and demodulation of a multi-channel signal can be achieved by an array of modulators and demodulators with frequency tracking capabilities.

Figure 3:
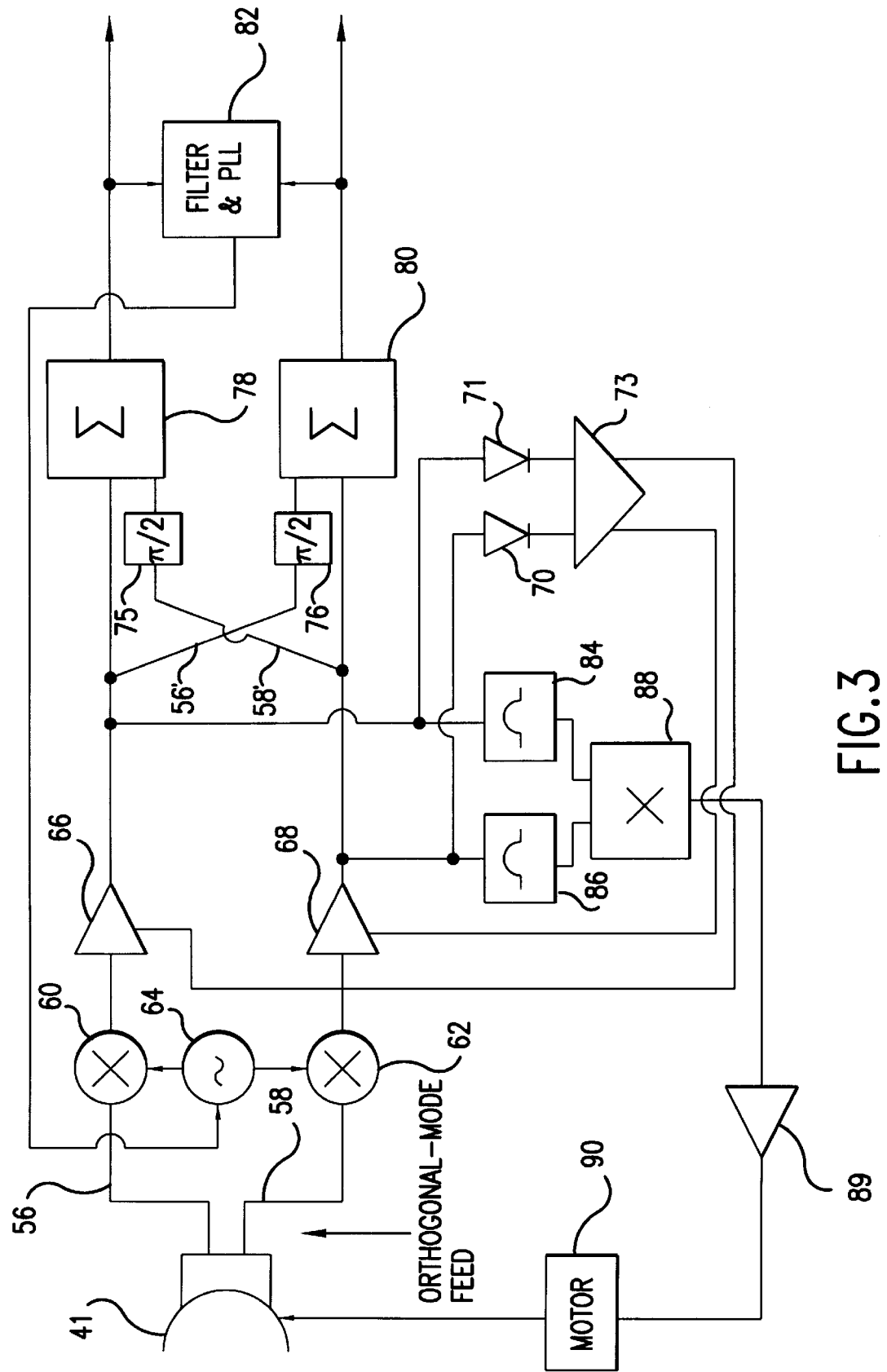
FIG. 3 is a schematic diagram of a portion of a transceiver according to one preferred embodiment of this invention.

FIG. 3 shows a schematic view of an adaptive receiver portion of a transceiver according to one preferred embodiment of this invention. Antenna 41 can receive two waves rotating oppositely with respect to each other. According to one preferred embodiment of this invention, antenna 41 comprises an orthogonal-mode feed. Components of each of the two waves enter channel 56 and channel 58. Oscillator 64 and mixers 60, 62 down-convert the frequencies of the signals in channels 56, 58 to an intermediate frequency (IF). If the signals in channel 56 and channel 58 have an equivalent magnitude, the signals are derived from circularly polarized waves. If elliptically polarized signals are received, the signal in the channel corresponding to the feed of antenna 41 aligned with the major axis of the ellipse will have a greater magnitude than the signal in the channel corresponding to the feed of antenna 41 aligned with the minor axis of the ellipse. Automatic gain control amp 66 and automatic gain control amp 68 are preferably electrically coupled with differential amplifier 73 through diodes 71, 70 respectively. Automatic gain control amps 66 and 68 preferably operate nearly identically with respect to each other, and thus can approximately equalize the magnitude of the signals in channels 56, 58.

Channels 56, 58 are preferably electrically coupled to phase detector 88 through limiter 84 and limiter 86. Phase detector 88 emits a signal to motor 90 through amp 89 as a function of a phase difference between the signals in channel 56 and the signals in channel 58. Motor 90 can be a servomotor that adjusts antenna 41 as a function of the signal from phase detector 88. A quadrature relationship can be restored to the signals in channels 56, 58 by rotating the orthogonal-mode feeds of antenna 41 with the major and minor axes of the ellipses of the rotating signals.

Because the two waves rotating oppositely with respect to each other are both absorbed by each feed of the orthogonal-mode antenna, components of each of the rotating waves exist in each of channel 56 and channel 58. The receiver according to one preferred embodiment of this invention isolates one of the rotating waves from one of the channels 56, 58, and the other rotating wave from the other of the channels 56, 58. An example of how this is achieved is as follows.

According to one preferred embodiment of this invention, two electrical vector components of a first wave rotating in a particular direction can be identified as C and jC, where j=+90°. Thus, the phase of vector jC leads the phase of vector C by 90°. The two electrical vector components of a second wave rotating oppositely with respect to the first wave can be identified as D and −jD, where −j=−90°. Thus, the phase of vector −jD lags the phase of vector D by 90°. Assume that the C component of the first wave and the D component of the second wave are absorbed by the lead corresponding to channel 56. Also assume that the jC component of the first wave and the −jD component of the second wave are absorbed by the lead corresponding to channel 58. Channel 58, after being down-converted to an IF, splits into a second channel designated by reference numeral 58', as shown by FIG. 3. One-half of the signal comprising components jC and −jD will enter channel 58' and be phase shifted +90° by phase shifter 75. After phase shifting, the phases of the components in channel 58' will be: jC ∠90°=−C, and −jD ∠90°=D. Thus, after phase shifter 75 has acted upon the signal in channel 58', the components of the signal from channel 58' entering power combiner 78 are −C and D. Power combiner 78 combines the −C and D components from channel 58' with the C and D components in channel 56. The C component from channel 56 and the −C component from channel 58' cancel one another, leaving only one signal in channel 56, which is the rotating wave designated as D.

In a similar fashion, the rotating wave designated as C is isolated in channel 58. One half of the C and D components from channel 56 enter channel 56'. Phase shifter 76 shifts the phases of the C and D components +90°. Accordingly, C ∠90°=jC, and D ∠90°=jD. Power combiner 80 combines the jC and jD components of channel 56' with the jC and −jD components of channel 58. The jD components from channel 56' cancel the −jD components from channel 58, leaving only the rotating wave designated as C in channel 58.

The isolated signals in channels 56, 58, following power combiners 78, 80, are independent and can be demodulated according to the-modulation method used by control center 20. Filter and PLL circuit 82 can be used for tracking local oscillator 64, and for synchronous demodulation if necessary.

Figure 4:
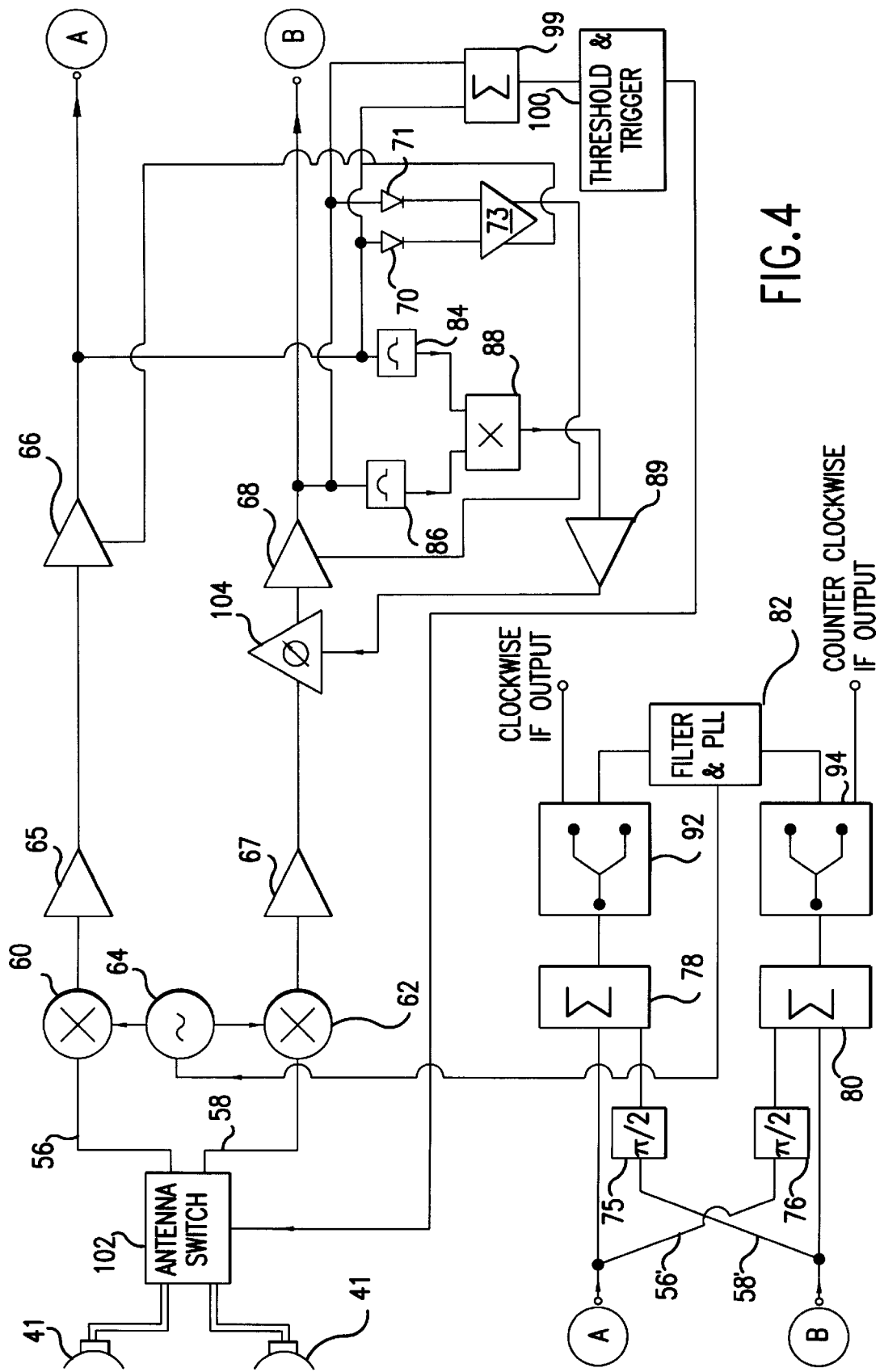
FIG. 4 is a schematic diagram of a portion of a transceiver according to another preferred embodiment of this invention.

FIG. 4 shows a schematic diagram of the receiver portion of a transceiver according to another preferred embodiment of this invention. The receiver shown in FIG. 4 uses antenna diversity control 100 to select one of a plurality of antennas 41. Power combiner 99 receives a portion of the signals from channel 56 and channel 58. As a function of either a magnitude of the signal from power combiner 99, or a difference in phase between the signals in channel 56 from the signals in channel 58, antenna diversity control selects a particular antenna 41 that provides sufficient signal intensity.

Because the relationship between the feeds of each of the antennas and the axes of the ellipse of the rotating waves is arbitrary, the signals in channel 56 may not be in quadrature with the signals in channel 58. Thus, the quadrature control according to this invention can be used to restore quadrature between the signals in channel 56 and the signals in channel 58. According to one preferred embodiment of this invention, multiplier 88 receives components of the signals in channels 56 and 58. The output signal of multiplier 88 is fed to electronic phase shifter 104 through amplifier 89. Electronic phase shifter 104 restores the quadrature relationship between the signals in channel 56 and the signals in channel 58. According to another preferred embodiment of this invention, a pair of quadrature controls, such as a pair of electronic phase shifters, can be used to restore quadrature.

The receiver shown in FIG. 4 requires no moving parts. This is particularly suited for applications where compactness and/or low power consumption are important factors. Such a design can be implemented with monolithic integrated circuits.

Intermediate frequency amplifiers 65, 67 can increase the magnitude of the signals in channels 56, 58. As in the receiver shown schematically in FIG. 3, the signals in channels 56, 58 can be restored to circular polarization by automatic gain control amplifiers 66, 68. The rotating waves can be isolated from each other with phase shifters 75, 76 and power combiners 78, 80. Power dividers 92, 94 can provide a portion of the signals in channels 56, 58 to filter and PLL circuit 82 for tracking of local oscillator 64, and synchronous demodulation.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A method comprising the steps of:

transmitting a first rotating wave;

receiving said first rotating wave, wherein components of said first rotating wave enter a first channel and a second channel;

isolating said first rotating wave from at least one of said first channel and said second channel, wherein said first channel is divided into a first channel primary path and a first channel secondary path, said second channel is divided into a second channel primary path and a second channel secondary path; and shifting a first phase of said first channel secondary path and combining said shifted first phase with said second channel primary path, and shifting a second phase of said second channel secondary path and combining said shifted second phase with said first channel primary path.

2. A method according to claim 1, wherein a second rotating wave is transmitted simultaneously with said first rotating wave, said second rotating wave rotates counter to said first rotating wave, reception means receives said second rotating wave, components of said second rotating wave enter said first channel and said second channel, and said second wave is isolated from at least one of said first channel and said second channel.

3. A system comprising:

transmission means for transmitting a first rotating wave;

reception means for receiving said first rotating wave, wherein components of said first rotating wave enter a first channel and a second channel, said first channel divided into a first channel primary path and a first channel secondary path, said second channel divided into a second channel primary path and a second channel secondary path;

isolation means for isolating said first rotating wave from at least one of said first channel and said second channel;

a first shifter shifting a first phase of said first channel secondary path, a first combiner combining said shifted first phase with said second channel primary path; and a second shifter shifting a second phase of said second channel secondary path, and a second combiner combining said shifted second phase with said first channel primary path.

4. A system according to claim 3, wherein said transmission means transmits a second rotating wave simultaneously with said first rotating wave, said second rotating wave rotates counter to said first rotating wave, said reception means receives said second rotating wave, components of said second rotating wave enter said first channel and said second channel, and said isolation means isolates said second wave from at least one of said first channel and said second channel.

5. A system according to claim 3, further comprising a plurality of automatic gain control amps equalizing a first magnitude of said first channel and a second magnitude of said second channel.

6. A system according to claim 3, wherein a phase difference value between said first phase and said second phase is calculated, and a phase difference signal is emitted as a function of said phase difference value.

7. A system according to claim 6, further comprising an antenna feed which is adjusted as a function of said phase difference signal.

8. A system according to claim 3, wherein said first phase is detected and said second phase is detected and one of said first phase and said second phase is adjusted to ensure a predetermined phase difference between said first phase and said second phase.

9. A system according to claim 8, further comprising an electronic phase shifter adjusting one of said first phase and said second phase to ensure a predetermined phase difference between said first phase and said second phase.

10. A system according to claim 3, wherein a phase difference value is calculated between said first phase and said second phase, and at least one of a plurality of antenna feeds is selected as a function of said phase difference value.

11. A system according to claim 3, further comprising a plurality of antenna feeds selected as a function of a first magnitude of said first channel and a second magnitude of said second channel.

12. A system according to claim 3, further comprising an interactive transmission station transmitting said first rotating wave and a plurality of interactive receiving stations receiving said first rotating wave.

13. A system according to claim 12, wherein at least one of said interactive receiving stations transmits a first signal to said interactive transmission station as a function of said first rotating wave.

* * * * *